United States Patent
Kim et al.

(10) Patent No.: US 12,191,477 B2
(45) Date of Patent: *Jan. 7, 2025

(54) SULFUR-CARBON COMPOSITE, PREPARATION METHOD THEREOF, POSITIVE ELECTRODE FOR LITHIUM SECONDARY BATTERY AND LITHIUM SECONDARY BATTERY COMPRISING SAME

(71) Applicant: LG ENERGY SOLUTION, LTD., Seoul (KR)

(72) Inventors: Minsu Kim, Daejeon (KR); Eunkyung Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 869 days.

This patent is subject to a terminal disclaimer.

(21) Appl. No.: 17/043,877

(22) PCT Filed: Sep. 6, 2019

(86) PCT No.: PCT/KR2019/011540
§ 371 (c)(1),
(2) Date: Sep. 30, 2020

(87) PCT Pub. No.: WO2020/060084
PCT Pub. Date: Mar. 26, 2020

(65) Prior Publication Data
US 2021/0036306 A1    Feb. 4, 2021

(30) Foreign Application Priority Data

Sep. 20, 2018 (KR) .................. 10-2018-0112639
Sep. 4, 2019 (KR) .................. 10-2019-0109637

(51) Int. Cl.
*H01M 4/133* (2010.01)
*H01M 4/02* (2006.01)
(Continued)

(52) U.S. Cl.
CPC ......... *H01M 4/133* (2013.01); *H01M 4/1393* (2013.01); *H01M 4/5815* (2013.01); *H01M 10/0525* (2013.01); *H01M 2004/028* (2013.01)

(58) Field of Classification Search
None
See application file for complete search history.

(56) References Cited

U.S. PATENT DOCUMENTS 11,658,293 B2 *  5/2023  Kim .................. H01M 4/38
                                                  429/218.1
11,695,111 B2 *  7/2023  Kim .................. H01M 4/364
                                                  429/218.1
(Continued)

FOREIGN PATENT DOCUMENTS

CN    106602063 A    4/2017
CN    107611395 A    1/2018
(Continued)

OTHER PUBLICATIONS

Balakumar et al., "High sulfur loaded carbon aerogel cathode for lithium-sulfur batteries", RSC Advances, vol. 5, No. 43, May 15, 2015, pp. 1-11 (12 pages total).
(Continued)

*Primary Examiner* — Robert S Carrico
(74) *Attorney, Agent, or Firm* — Birch, Stewart, Kolasch & Birch, LLP

(57) ABSTRACT

Discussed is sulfur-carbon composite including a porous carbon material; and sulfur, wherein the sulfur is present in at least a part of an inside of the porous carbon material and on a surface of the porous carbon material, a preparation
(Continued)

method thereof, a positive electrode for a lithium secondary battery including the same, and a lithium secondary battery.

7 Claims, 11 Drawing Sheets

(51) Int. Cl.
*H01M 4/1393* (2010.01)
*H01M 4/58* (2010.01)
*H01M 10/0525* (2010.01)

(56) References Cited

U.S. PATENT DOCUMENTS

| | | | |
|---|---|---|---|
| 2013/0302693 A1* | 11/2013 | Sun | H01M 4/583 252/502 |
| 2014/0170412 A1 | 6/2014 | Ji et al. | |
| 2014/0234702 A1 | 8/2014 | Zhang et al. | |
| 2014/0287306 A1 | 9/2014 | Takeshi et al. | |
| 2015/0129810 A1* | 5/2015 | Tenzer | C08F 120/44 252/511 |
| 2017/0187040 A1 | 6/2017 | Yoneda et al. | |
| 2018/0351166 A1* | 12/2018 | Chen | C01B 32/174 |
| 2020/0152988 A1 | 5/2020 | Gao et al. | |
| 2020/0220169 A1* | 7/2020 | Kim | B29B 7/90 |

FOREIGN PATENT DOCUMENTS

| | | |
|---|---|---|
| CN | 107946553 A | 4/2018 |
| CN | 104205431 A | 9/2024 |
| EP | 3 457 474 A1 | 3/2019 |
| JP | 2014-118563 A | 8/2014 |
| JP | 2017-119620 A | 7/2017 |
| KR | 10-2014-0082994 A | 7/2014 |
| KR | 10-1686640 B1 | 12/2016 |
| KR | 10-2017-0026022 A | 3/2017 |
| KR | 10-2017-0135658 A | 12/2017 |
| KR | 10-2018-0017796 A | 2/2018 |
| WO | WO 2017/079976 A1 | 5/2017 |
| WO | WO-2019103326 A2 * | 5/2019 ............ B29B 7/002 |

OTHER PUBLICATIONS

Extended European Search Report for European Application No. 19863294.5, dated May 31, 2021.
Gao et al., "Lithiated Nafion as polymer electrolyte for solid-state lithium sulfur batteries using carbon-sulfur composite cathode", Journal of Power Sources, vol. 382, 2018, pp. 179-189.
Tan et al., "Acetylene Black/Sulfur Composites Synthesized by a Solution Evaporation Concentration Crystallization Method and Their Electrochemical Properties for Li/S Batteries". Energies, vol. 6, Jul. 15, 2013, pp. 3466-3480.
Cheng et al., "Aligned carbon nanotube/sulfur composite cathodes with high sulfur content for lithium-sulfur batteries," Nano Energy, vol. 4, 2014 (Available online Dec. 30, 2013), pp. 65-72.
Jin et al.,"Sulfur/Carbon Nanotube Composite Film as a Flexible Cathode for Lithium-Sulfur Batteries," The Journal of Physical Chemistry C. Sep. 19, 2013, pp. 21112-21119.
International Search Report (PCT/ISA/210) issued in PCT/KR2019/011540 mailed on Dec. 18, 2019.

* cited by examiner

[Figure 1]
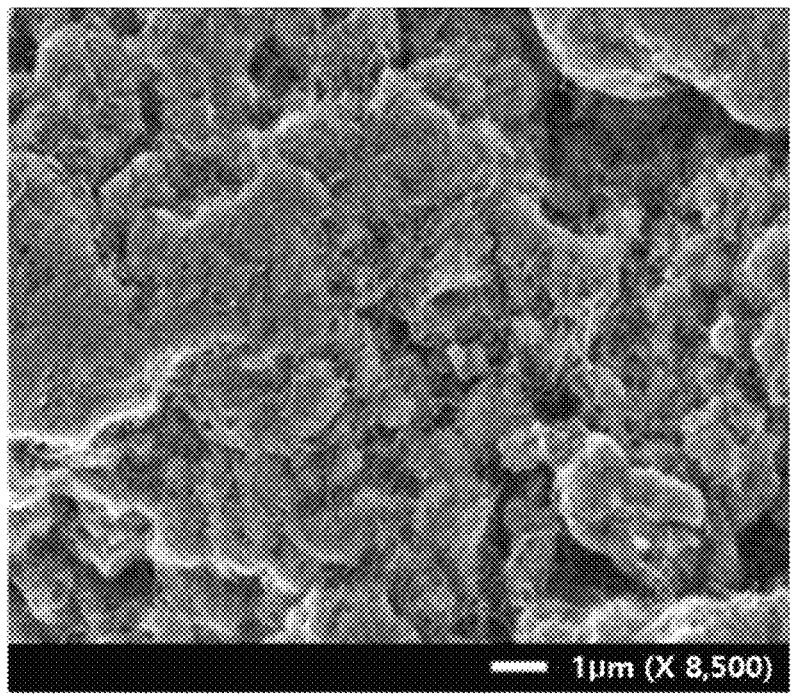
[Figure 2]
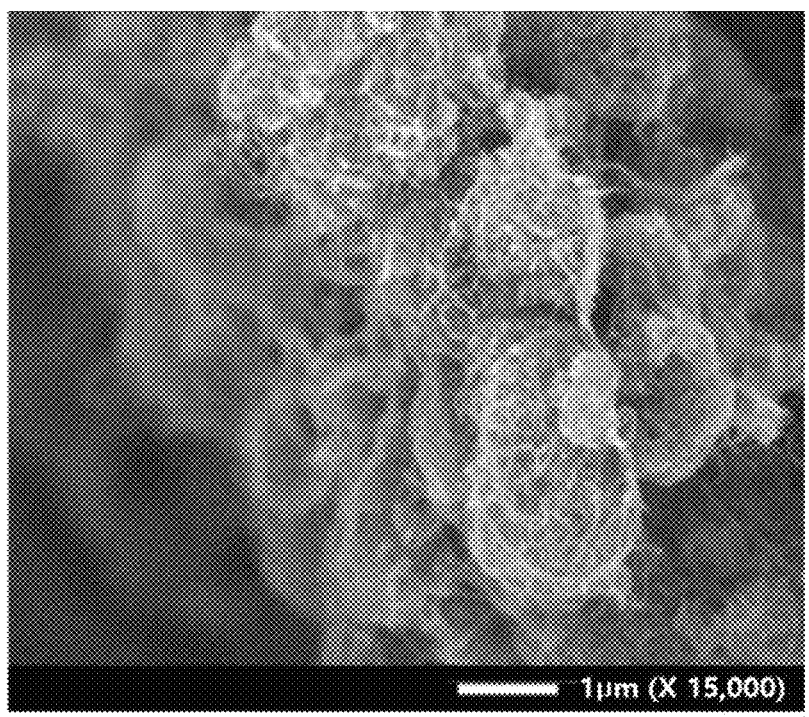

[Figure 3]
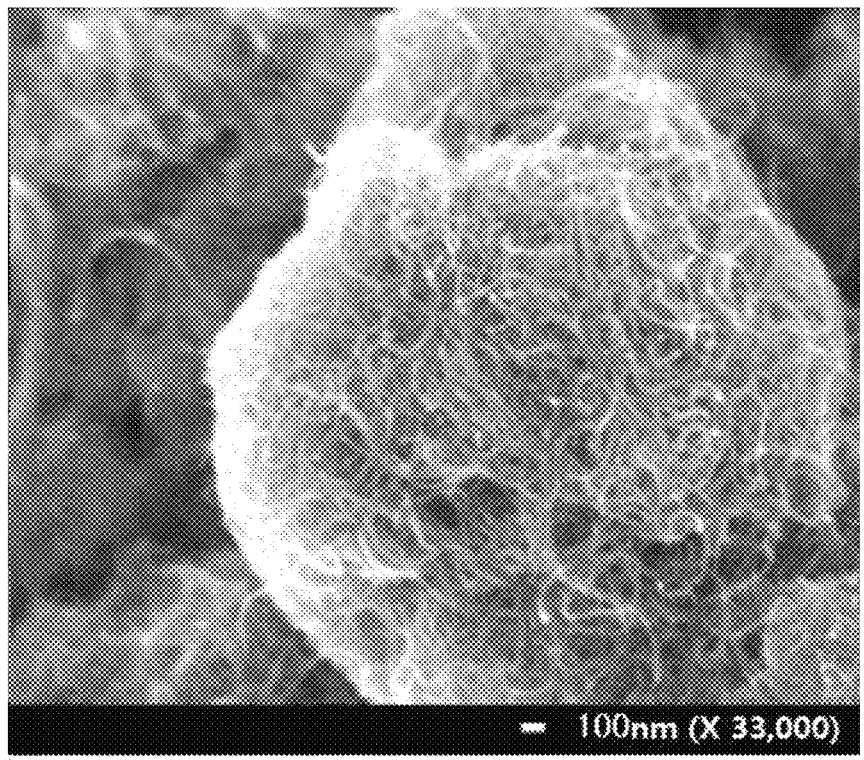
[Figure 4]
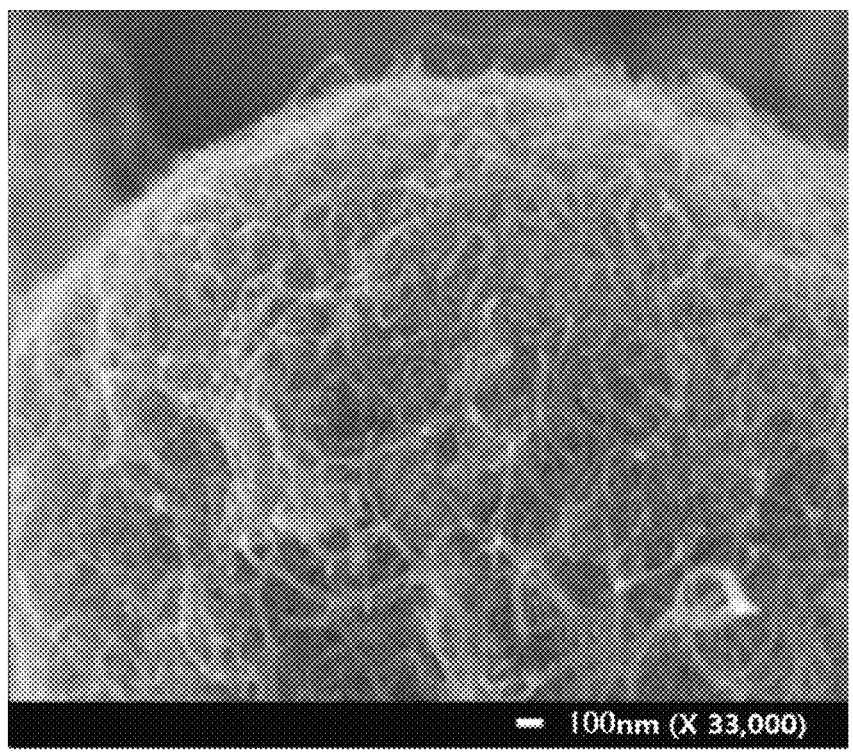

[Figure 5]
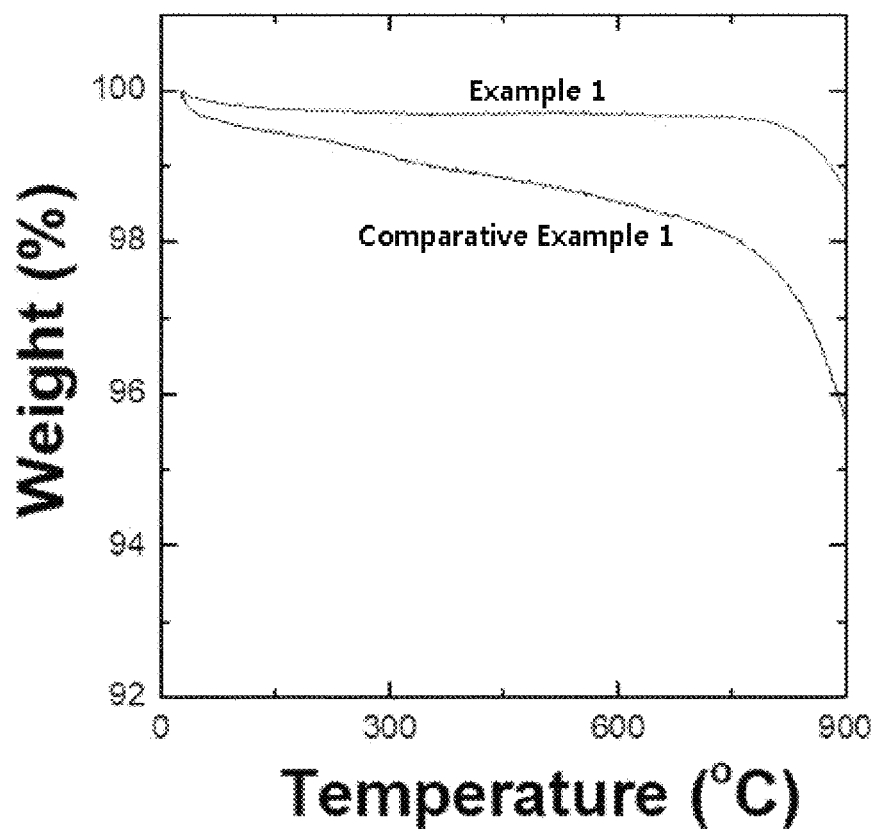

[Figure 6]
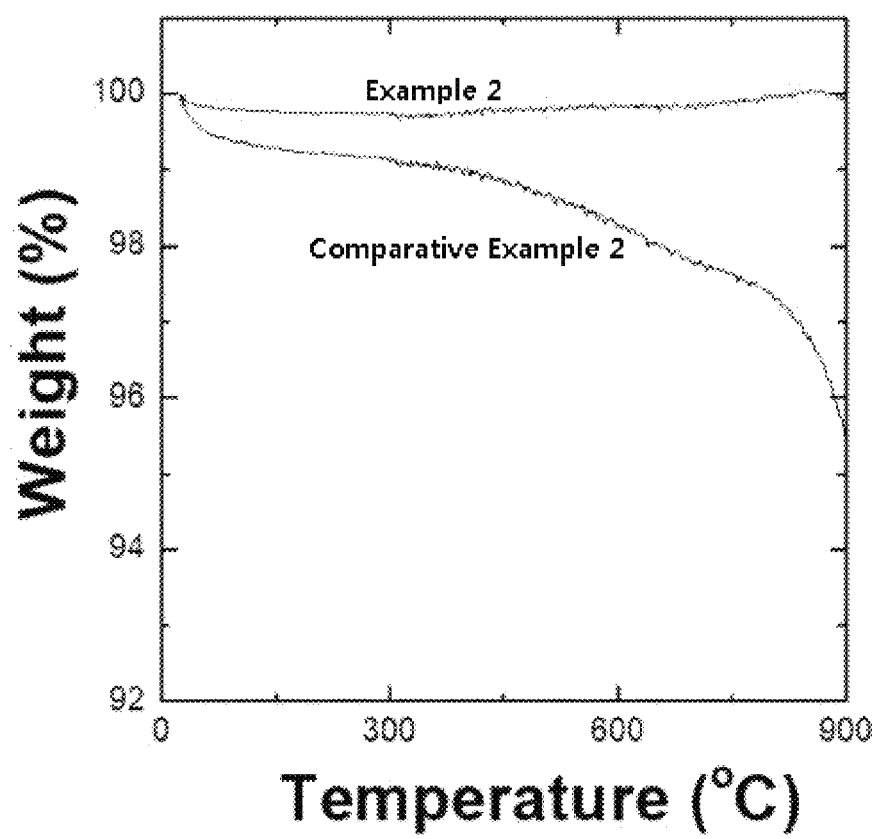
[Figure 7]
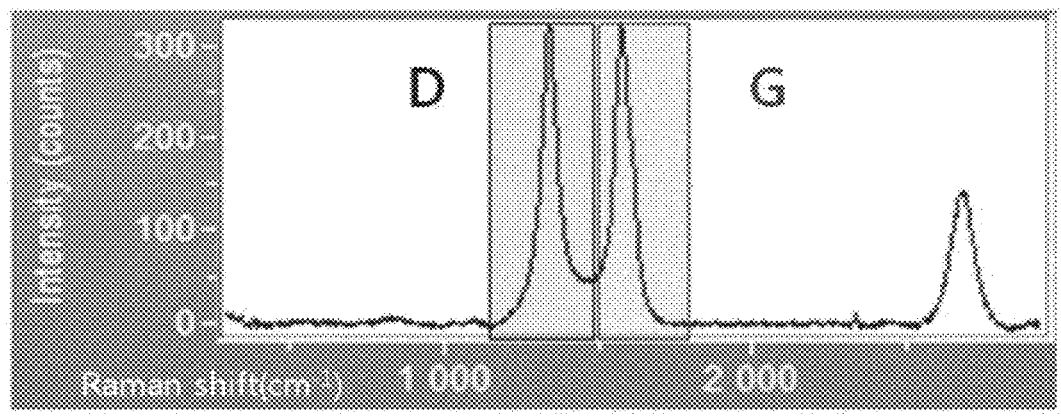

[Figure 8]
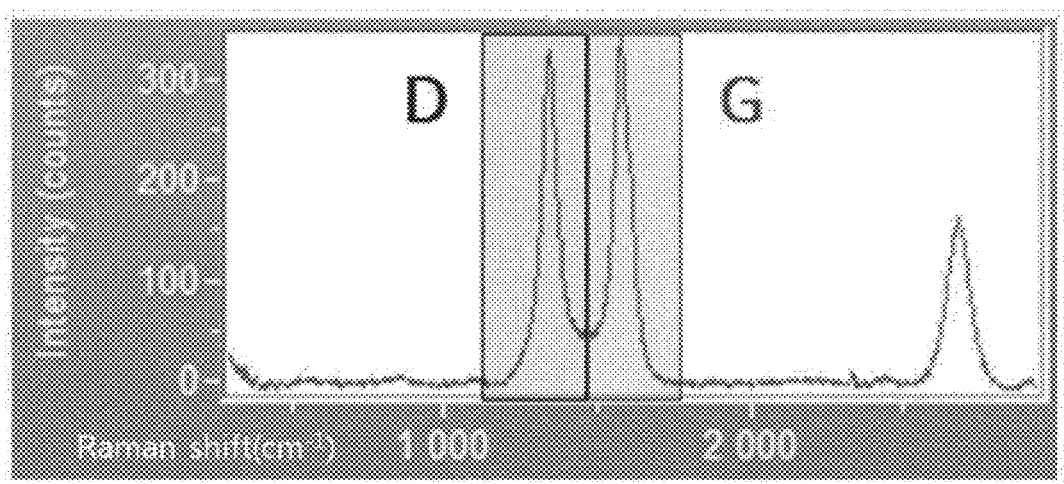
[Figure 9]
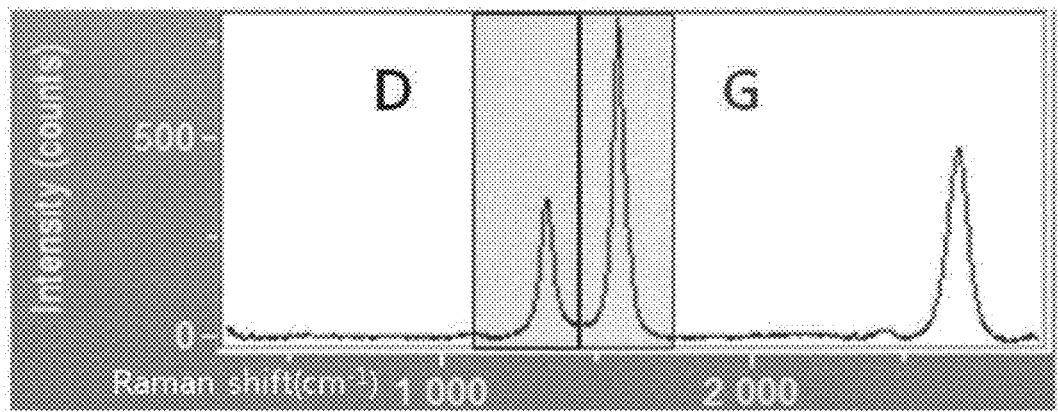

[Figure 10]
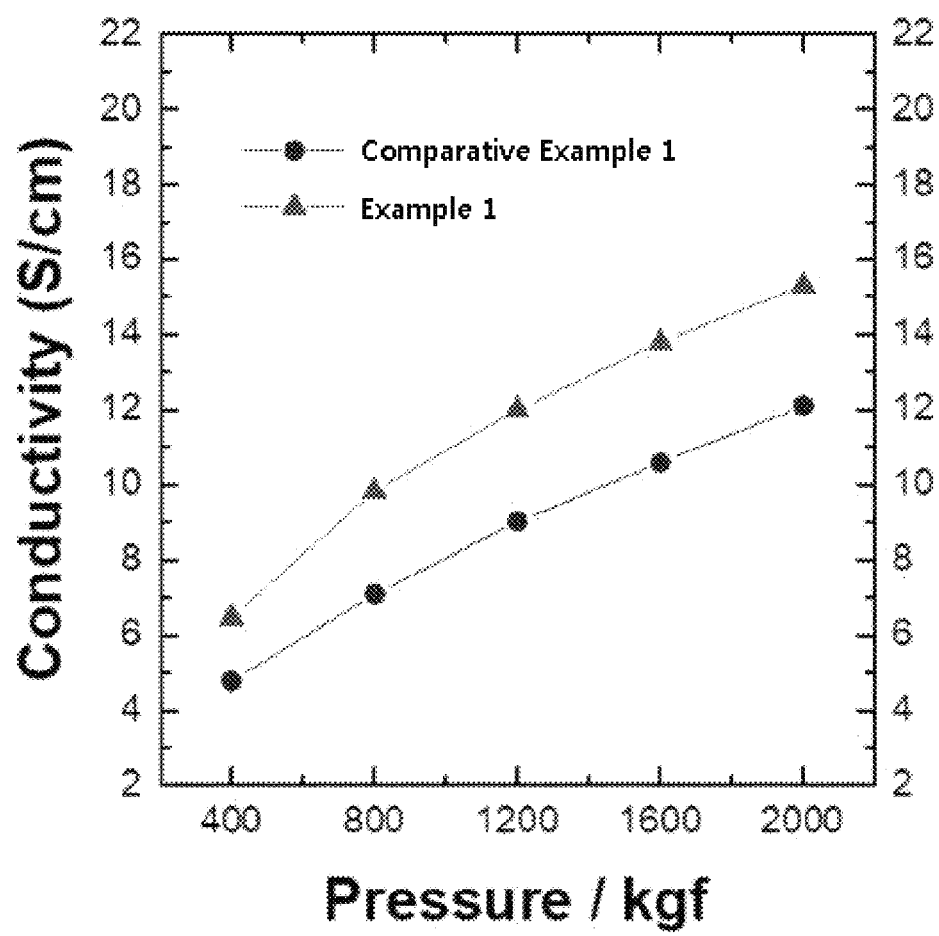

[Figure 11]
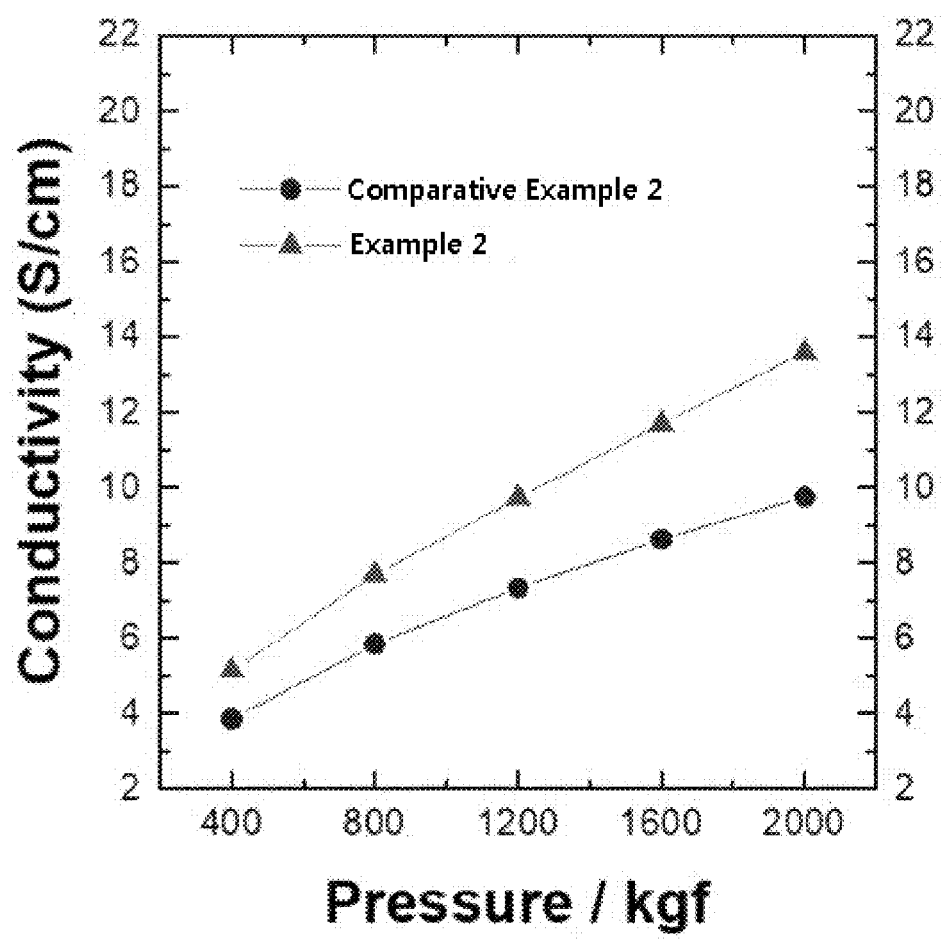

[Figure 12]
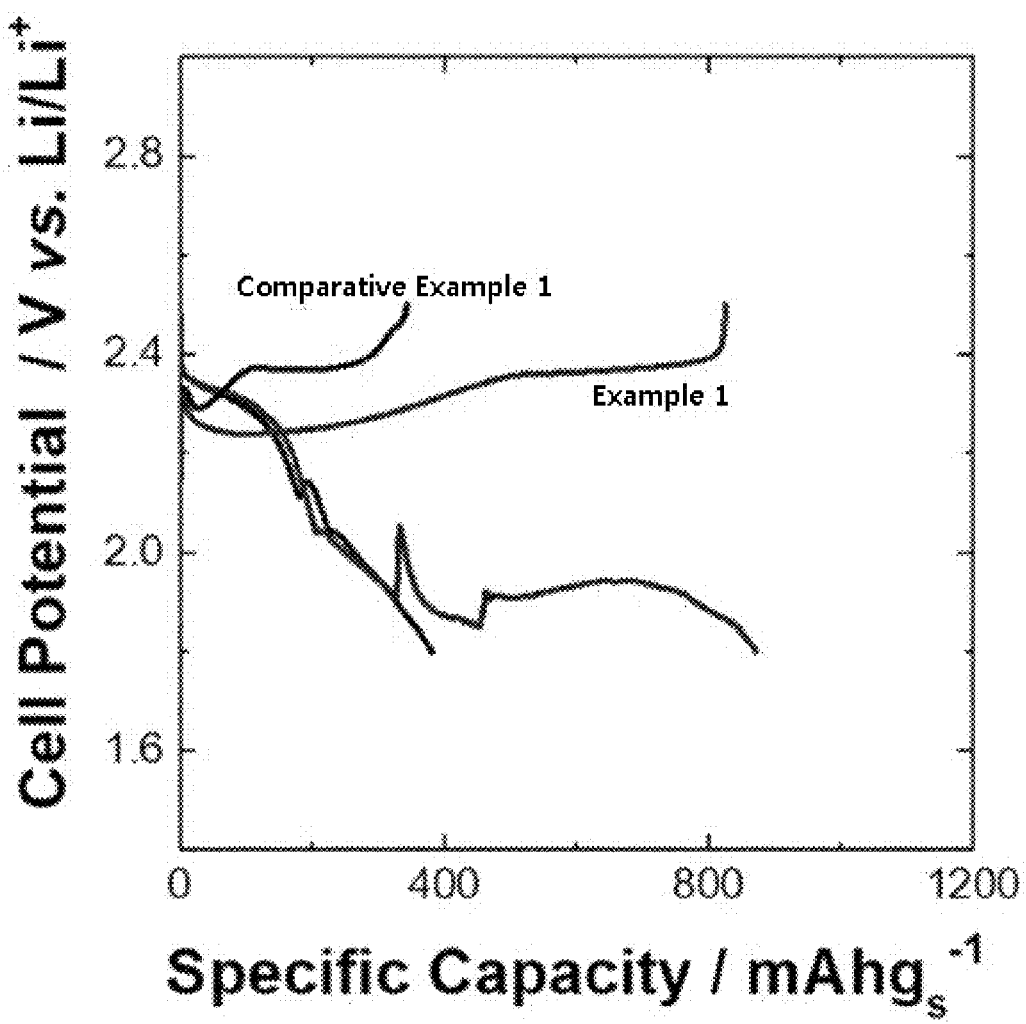

[Figure 13]
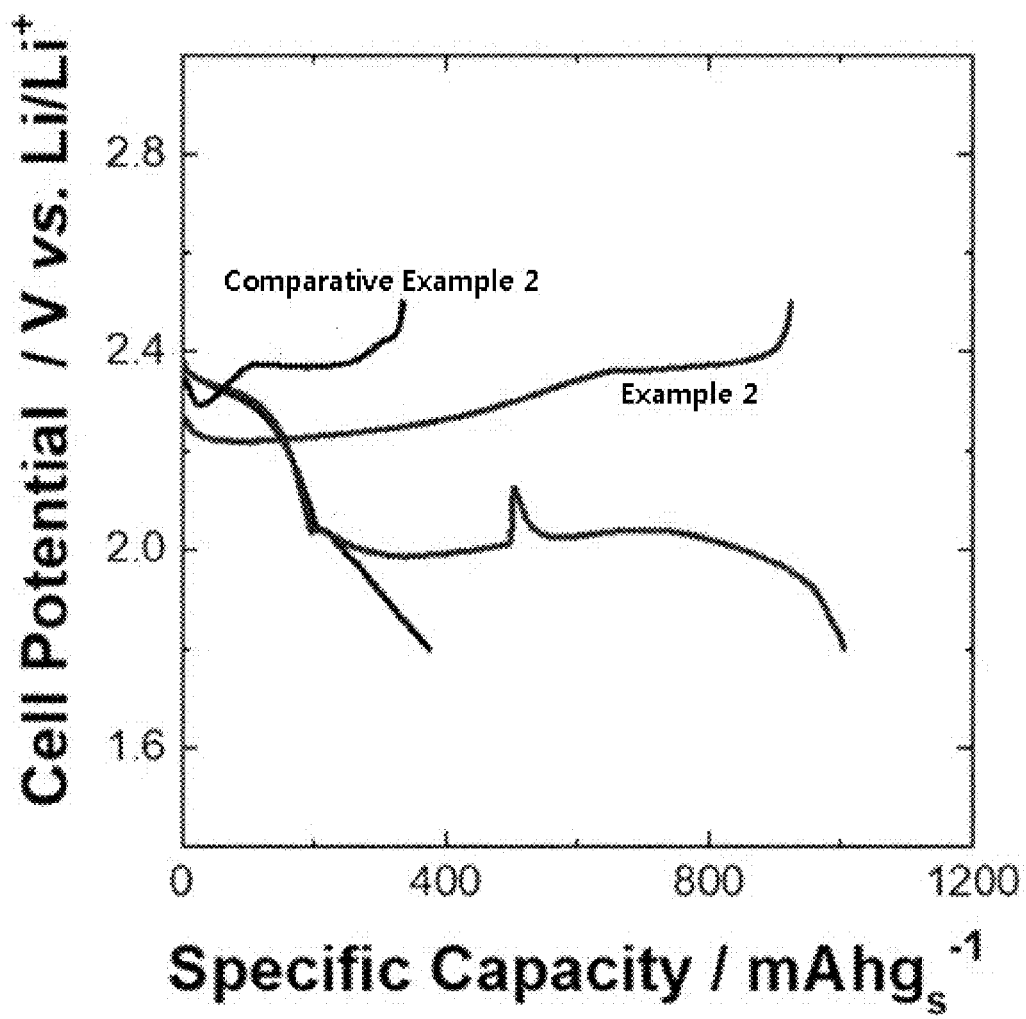

[Figure 14]
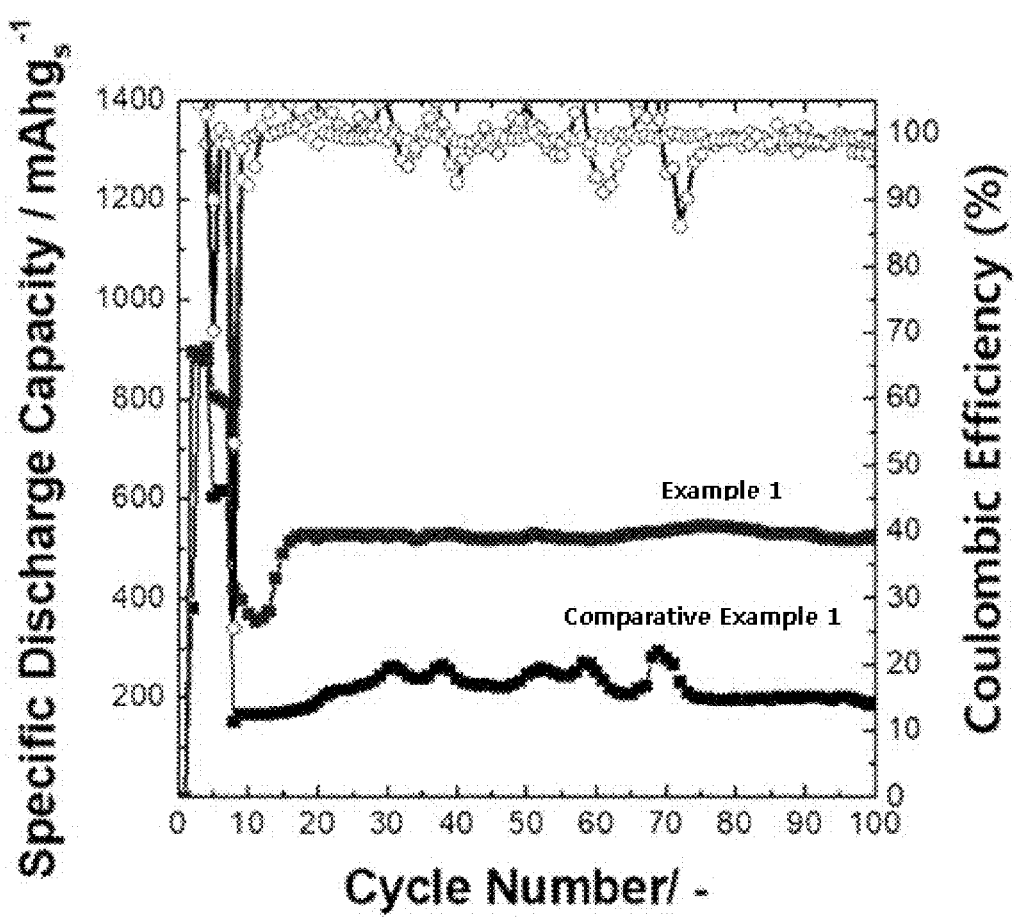

[Figure 15]
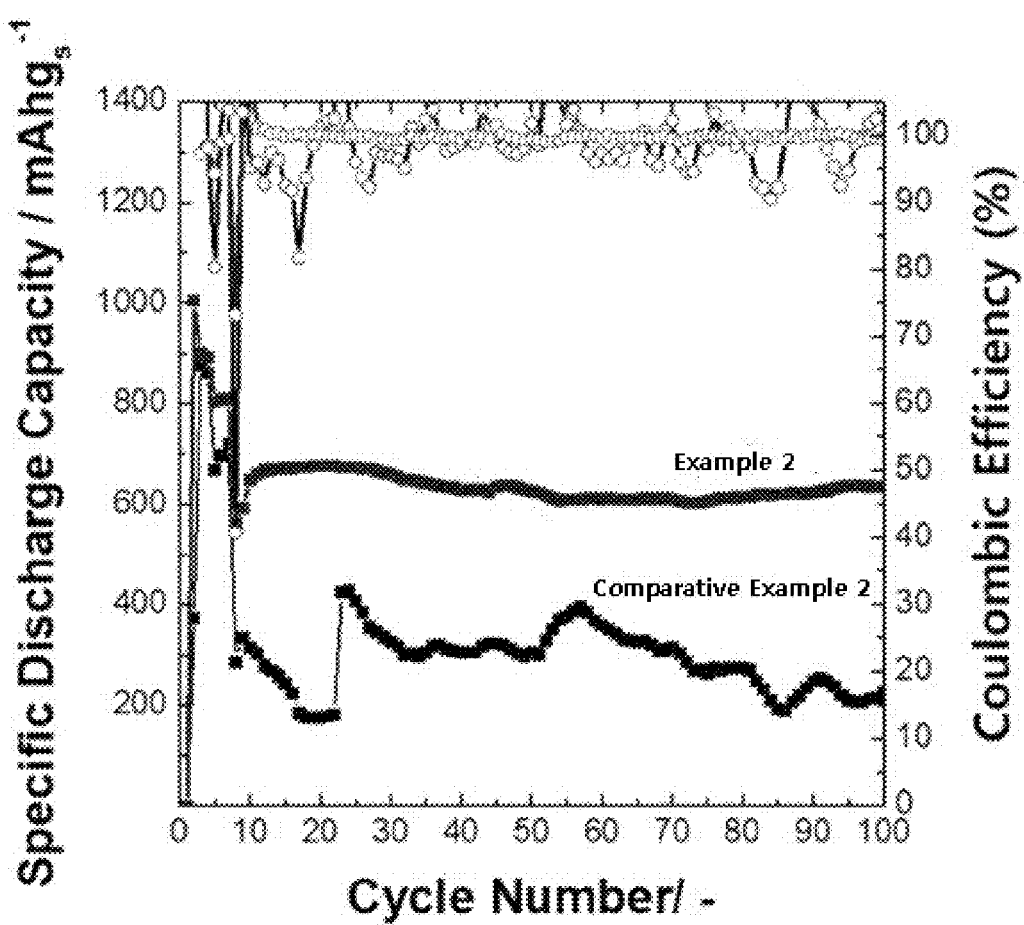

SULFUR-CARBON COMPOSITE, PREPARATION METHOD THEREOF, POSITIVE ELECTRODE FOR LITHIUM SECONDARY BATTERY AND LITHIUM SECONDARY BATTERY COMPRISING SAME

TECHNICAL FIELD

The present application claims the benefit of priorities based on Korean Patent Application No. 10-2018-0112639 filed on Sep. 20, 2018, and Korean Patent Application No. 10-2019-0109637 filed on Sep. 4, 2019, entire disclosure of which are incorporated herein by reference its entirety.

The present invention relates to a sulfur-carbon composite, a preparation method thereof, a positive electrode for a lithium secondary battery, and a lithium secondary battery comprising the same.

BACKGROUND ART

Recently, with the rapid development in the field of electronic devices and electric vehicles, the demand for secondary batteries is increasing. In particular, with the trend toward miniaturization and weight reduction of portable electronic devices, there is a growing demand for secondary batteries having a high energy density that can cope with them.

Among the secondary batteries, a lithium-sulfur battery is a secondary battery that uses sulfur-based compounds having a sulfur-sulfur bond as a positive electrode active material, and uses alkali metals such as lithium, carbon-based materials in which intercalation and deintercalation of metal ions such as lithium ions occur, or silicon or tin, which forms an alloy with lithium, as a negative electrode active material. Specifically, during the discharging which is a reduction reaction, as the S—S bond is cut off, the oxidation number of sulfur decreases, and during the charging which is an oxidation reaction, as the oxidation number of sulfur increases, the S—S bond is re-formed. Through this oxidation-reduction reaction, electrical energy is stored and generated In particular, sulfur used as a positive electrode active material in lithium-sulfur batteries has a theoretical energy density of 1.675 mAh/g, and thus has a theoretical energy density of about five times higher than the positive electrode active material used in conventional lithium secondary batteries, thereby enabling batteries to express high power and high energy density. In addition, since sulfur has the advantage of being cheap and rich in resources and thus being readily available and environmentally friendly, sulfur is drawing attention as an energy source not only for portable electronic devices but also for medium and large devices such as electric vehicles.

However, since sulfur is an insulator with no electrical conductivity, which has an electrical conductivity of $5 \times 10^{-30}$ S/cm, sulfur has a problem that the movement of electrons generated by the electrochemical reaction is difficult. Therefore, sulfur is being used as a sulfur-carbon composite by complexing it with a conductive material such as carbon that can provide an electrochemical reaction site.

The carbon material whose surface is modified by a functional group having a hydrophilic group has excellent electrical conductivity. Accordingly, if the sulfur-carbon composite is prepared using the carbon material, it can be expected to improve the reactivity by efficient electron transfer.

However, since the hydrophilic functional group of the carbon material has poor affinity with sulfur having hydrophobicity, sulfur is not evenly impregnated into the carbon material, and thus a problem of poor reactivity and life characteristics of the battery occurs.

PRIOR ART DOCUMENTS

Patent Document

Korean Patent Publication No. 10-2014-0082994

DISCLOSURE

Technical Problem

In order to solve the above problems, the inventors of the present invention have prepared a sulfur-carbon composite by complexing sulfur with a porous carbon material from which a functional group was removed by heat-treating a porous carbon material surface-modified with a functional group, and then have completed the present invention by confirming that due to the high specific surface area and pore volume of the sulfur-carbon composite thus prepared, sulfur is evenly supported in the inside and on the surface of the porous carbon material, and when used as a positive electrode active material, it exhibits the effect of excellent electrical conductivity, discharging effect, and lifetime characteristics.

Therefore, it is an object of the present invention to provide a sulfur-carbon composite.

In addition, it is another object of the present invention to provide a method for preparing the sulfur-carbon composite.

In addition, it is another object of the present invention to provide a positive electrode for a lithium secondary battery comprising the sulfur-carbon composite and a lithium secondary battery comprising the same.

Technical Solution

In order to achieve the above objects, the present invention provides a sulfur-carbon composite comprising a porous carbon material; and sulfur, wherein the sulfur is present in at least a part of an inside of the porous carbon material and on a surface of the porous carbon material, wherein the sulfur-carbon composite has a specific surface area of 7 $m^2/g$ to 20 $m^2/g$ and a pore volume of 0.1 $cm^3/g$ to 0.3 $cm^3/g$.

In addition, the present invention provides a method for preparing a sulfur-carbon composite comprising the steps of.
 (a) heat-treating a porous carbon material surface-modified with a functional group to remove the functional group; and
 (b) complexing the porous carbon material from which the functional groups have been removed with sulfur powder to produce a sulfur-carbon composite.

In addition, the present invention provides a positive electrode for a lithium secondary battery comprising the sulfur-carbon composite of the present invention described above.

In addition, the present invention provides a lithium secondary battery comprising a positive electrode; a negative electrode; a separator interposed between the positive electrode and the negative electrode; and an electrolyte solution, wherein the positive electrode is the positive electrode of the present invention described above.

Advantageous Effects

In the sulfur-carbon composite of the present invention, since sulfur is evenly supported in the inside and on the surface of the porous carbon material, when used as a positive electrode active material of a lithium secondary battery, the overvoltage of the battery may be improved, and the discharge capacity and lifetime characteristics may be improved.

In addition, the preparation method of the sulfur-carbon composite of the present invention can remove the functional group of the porous carbon material surface-modified with a functional group, and thus not only can facilitate the support of sulfur, but also can evenly support sulfur in the pores and on the surface of the porous carbon material.

DESCRIPTION OF DRAWINGS

FIGS. 1 and 2 are SEM photographs of the sulfur-carbon composite prepared in Example 1.

FIGS. 3 and 4 are SEM photographs of the sulfur-carbon composite prepared in Example 2.

FIG. 5 is a TGA graph of the porous carbon material of Example 1 and Comparative Example 1.

FIG. 6 is a TGA graph of the porous carbon material of Example 2 and Comparative Example 2.

FIG. 7 is a Raman measurement graph of the porous carbon material of Example 2.

FIG. 8 is a Raman measurement graph of the porous carbon material of Comparative Example 2.

FIG. 9 is a Raman measurement graph of the porous carbon material of Comparative Example 3.

FIG. 10 shows electrical conductivity graphs of sulfur-carbon composites of Example 1 and Comparative Example 1.

FIG. 11 shows electrical conductivity graphs of sulfur-carbon composites of Example 2 and Comparative Example 2.

FIG. 12 shows charging/discharging graphs of each battery manufactured by using sulfur-carbon composites of Example 1 and Comparative Example 1 as a positive electrode active material.

FIG. 13 shows charging/discharging graphs of each battery manufactured by using sulfur-carbon composites of Example 2 and Comparative Example 2 as a positive electrode active material.

FIG. 14 shows graphs of life characteristics measured in each battery manufactured by using sulfur-carbon composites of Example 1 and Comparative Example 1 as a positive electrode active material.

FIG. 15 shows graphs of life characteristics measured in each battery manufactured by using sulfur-carbon composites of Example 2 and Comparative Example 2 as a positive electrode active material.

BEST MODE

Hereinafter, the present invention will be described in more detail.

Sulfur-Carbon Composite

The present invention relates to a sulfur-carbon composite comprising a porous carbon material; and sulfur, wherein the sulfur is present in at least a part of an inside of the porous carbon material and on a surface of the porous carbon material, wherein the sulfur-carbon composite has a specific surface area of 7 $m^2/g$ to 20 $m^2/g$ and a pore volume of 0.1 $cm^3/g$ to 0.3 $cm^3/g$.

The specific surface area of the sulfur-carbon composite of the present invention is 7 to 20 $m^2/g$, preferably 8 to 15 $m^2/g$. If the specific surface area of the sulfur-carbon composite is less than 7 $m^2/g$, it means that sulfur is covering the surface of the porous carbon material, and that sulfur is not evenly supported on the porous carbon material, and thus the electrical conductivity of the sulfur-carbon composite can be reduced. If the specific surface area of the sulfur-carbon composite exceeds 20 $m^2/g$, it means that sulfur is not properly supported inside the porous carbon material.

In addition, the pore volume of the sulfur-carbon composite of the present invention is 0.1 to 0.3 $cm^3/g$, preferably 0.1 to 0.15 $cm^3/g$. If the pore volume of the sulfur-carbon composite is less than 0.1 $cm^3/g$, it means that sulfur is covering the surface of the porous carbon material, and that sulfur is not evenly supported on the porous carbon material, and thus the electrical conductivity of the sulfur-carbon composite can be reduced. If the pore volume of the sulfur-carbon composite exceeds 0.3 $cm^3/g$, it means that sulfur is not properly supported inside the porous carbon material.

In the sulfur-carbon composite of the present invention, it can be seen that sulfur is evenly supported on at least part of the surface and the inside of the porous carbon material due to the specific surface area described above, and that sulfur is evenly supported inside the porous carbon material due to the pore volume described above.

Therefore, the sulfur-carbon composite of the present invention has sulfur evenly supported on at least one part of the inside and on the surface of the porous carbon material, thereby improving the electrical conductivity of the sulfur-carbon composite, and improving the operation characteristics, preferably the discharging capacity and life characteristics of the battery comprising it as an electrode active material.

The specific surface area and pore volume of the sulfur-carbon composite of the present invention can be obtained by heat-treating the porous carbon material surface-modified with a hydrophilic functional group to remove the functional group and then allowing sulfur to be supported.

That is, the porous carbon material of the sulfur-carbon composite of the present invention is a porous carbon material from which a functional group has been removed by heat-treating the porous carbon material surface-modified with a hydrophilic functional group.

The porous carbon material surface-modified with a hydrophilic functional group may generally be prepared by treating the porous carbon material with an acid, and the hydrophilic functional group may be a hydroxyl group or a carboxyl group.

The porous carbon material surface-modified with the hydrophilic functional group may exhibit excellent electrical conductivity due to the hydrophilic functional group. However, the hydrophilic functional group of the porous carbon material does not have good affinity with sulfur, which shows hydrophobicity, and thus does not evenly support sulfur, and also may significantly reduce the electrical conductivity of the sulfur-carbon composite because sulfur covers the surface of the porous carbon material when sulfur is supported. Therefore, even if the electrical conductivity of the porous carbon material surface-modified with the hydrophilic functional group is excellent, since sulfur is not evenly supported, when the sulfur-carbon composite comprising the same is used as an electrode active material, the battery may not operate normally.

Accordingly, in the present invention, a porous carbon material from which the functional group was removed by heat-treating the porous carbon material surface-modified with a hydrophilic functional group is used. The sulfur-carbon composite of the present invention comprising the porous carbon material has a specific surface area and pore volume in the above-described range, which means that sulfur is evenly supported on the porous carbon material, and thus may exhibit excellent electrical conductivity.

Therefore, the porous carbon material of the sulfur-carbon composite of the present invention, from which the functional group is removed, can solve the problem of uneven supporting of sulfur generated by the hydrophilic functional group as described above, and thus may provide a sulfur-carbon composite having excellent electrical conductivity.

For example, even in the case that sulfur-carbon composites prepared by supporting the same amount of sulfur on a porous carbon material surface-modified with a hydrophilic functional group and a porous carbon material from which the functional group was removed prepared by heat-treating the porous carbon material surface-modified with the hydrophilic functional group is supporting the same amount of sulfur, the porous carbon material surface-modified with the hydrophilic functional group does not support sulfur evenly due to the hydrophilic functional group and thus does not operate the battery normally, but the porous carbon material from which the functional group is removed by heat treatment has no functional group so that sulfur can be evenly supported, thereby providing excellent electrical conductivity and improving the discharging capacity and life characteristics of the battery.

More specifically, as a result of thermogravimetric analyzer (TGA) of the porous carbon material from which the functional group is removed by heat treatment, the weight loss rate is 1% or less when heated up from 0° C. to 900° C. Since the removal of the functional group was carried out through heat treatment, the weight loss was very slight in thermogravimetric analysis. However, the porous carbon material surface-modified with the hydrophilic functional group contains the functional group, resulting in a weight loss of 2% or more.

In addition, the porous carbon material from which the functional group is removed by the heat treatment has a D/G peak ratio of 0.8 to 1.5 at the Raman measurement. If the ratio is less than 0.8, it means that the heat treatment has been performed at a high temperature of 2000° C. or higher, and thus the graphitization reaction occurs due to the high temperature, and damage to the porous carbon material occurs. If the ratio is higher than 1.5, the conductivity is greatly reduced.

As a porous carbon material that can be used in the sulfur-carbon composite of the present invention, a porous carbon material capable of imparting conductivity to sulfur, which is an insulator, and capable of being surface-modified with a hydrophilic functional group is used.

Specifically, the porous carbon material may be at least one selected from the group consisting of carbon nanotubes, graphene, graphite, amorphous carbon, carbon black, and activated carbon. Among these, carbon nanotubes, graphite, and carbon black are preferable in terms of excellent electrical conductivity, specific surface area, and supported amount of sulfur.

The carbon nanotubes (CNT) may be single-walled carbon nanotubes (SWCNT) or multi-walled carbon nanotubes (MWCNT). The carbon nanotubes preferably have a diameter of 1 to 200 nm, more preferably 1 to 100 nm, and most preferably 1 to 50 nm. If the diameter of the carbon nanotubes exceeds 200 nm, there is a problem that the specific surface area is reduced, thereby reducing the reaction area with the electrolyte solution.

The graphite may be one or more of artificial graphite and natural graphite. The natural graphite comprises flake graphite, high crystalline graphite, microcrystalline (or cryptocrystalline; amorphous) graphite and the like, and the artificial graphite comprises primary or electrographite, secondary graphite, graphite fiber and the like. The graphite particle can be used alone in one type or in combination of 2 or more types of graphite mentioned above.

The graphite particles are not particularly limited in their crystal structures as long as they can reversibly intercalate lithium ions during charging/discharging. For example, the graphite particles may have a plane spacing of 0.335 nm or more and less than 0.337 nm, for example, 0.335 nm or more and less than 0.337 nm, as measured by X-ray wide-angle diffraction.

In addition, the size of the graphite particles is preferably the same or smaller than the size of the silicon-based particles in terms of uniform mixing and mixture density improvement. For example, the average particle diameter of the graphite particles may be 20 μm or less, specifically for example 0.1 to 20 μm or less, more specifically 0.1 to 10 μm, 1 to 10 μm, or 1 to 5 μm.

The carbon black may be, for example, at least one selected from the group consisting of acetylene black, Ketjen black, furnace black, oil-furnace black, Columbia carbon, channel black, lamp black, and thermal black. The particle size of the carbon black is not limited, but an average particle diameter of 0.01 to 0.5 μm is preferable in terms of securing a reaction area with an electrolyte solution.

The sulfur is preferably inorganic sulfur or elemental sulfur ($S_8$).

In the sulfur-carbon composite according to the present invention, the porous carbon material and the sulfur are preferably mixed in a weight ratio of 1:1 to 1:9. If the content of the porous carbon material exceeds the above range, the content of sulfur, which is an active material, is lowered, causing problems in securing battery capacity. If the content of the porous carbon material is less than the above range, the content of the porous carbon material is insufficient to impart electrical conductivity. Therefore, the content of porous carbon material is properly adjusted within the above range.

The method of complexing the sulfur-carbon composite of the present invention is not particularly limited in the present invention, and a method commonly used in the art may be used. For example, a complexing method by simply mixing the porous carbon material having a specific surface area in the above range and sulfur and then heat-treating them may be used.

The sulfur is supported on at least a portion of the inside and on the surface of the porous carbon material, and more sulfur is supported in the interior than on the surface.

In the present invention, the inside of the porous carbon material means the pores of the porous carbon material.

The diameter of the sulfur-carbon composite of the present invention is not particularly limited in the present invention, and may vary, but may be preferably 0.1 to 20 μm, more preferably 1 to 10 μm. When satisfying the above range, it is possible to manufacture the electrode with high loading.

Preparation Method of Sulfur-Carbon Composite

The present invention relates to a method for preparing a sulfur-carbon composite comprising the steps of:
 (a) heat-treating the porous carbon material surface-modified with the functional group to remove the functional group; and
 (b) complexing the porous carbon material from which the functional groups have been removed with sulfur powder to produce a sulfur-carbon composite.

Step (a) is a step of heat-treating the porous carbon material surface-modified with the functional group to remove the functional group of the porous carbon material.

The functional group is a hydrophilic functional group, preferably a hydroxyl group or a carboxyl group.

It is known that if a carbon-based material such as carbon powder is treated with an acidic solution and oxidized, a functional group containing oxygen, i.e., hydroxyl group or carboxyl group, is produced on the surface. If the functional group is comprised, the effect of excellent electrical conductivity can be seen.

Therefore, the porous carbon material surface-modified with the functional group may be prepared by treating with acid. The acid may be at least one selected from nitric acid, sulfuric acid, and a mixed solution thereof.

Specifically, the porous carbon material, which is surface-modified with a functional group, may be manufactured by a simple process of sonication or heat treatment after immersing the porous carbon material in an acid.

The sonication may be performed by a sonicator commonly used in the art, and the treatment temperature is not particularly limited but is preferably 15 to 35° C., preferably room temperature.

In addition, in the case of the heat treatment, it may be carried out in a heat resistant and pressure resistant container such as an autoclave, and the heating temperature is preferably 90 to 120° C. This mixed solution treatment is carried out for 30 minutes to 4 hours, preferably 1 to 3 hours.

In addition, the sonication and the heat treatment may be performed simultaneously, or they may be sequentially performed, such as the heat treatment after the sonication.

The functional group of the porous carbon material is removed by heat-treating the porous carbon material surface-modified with the functional group.

The heat treatment may be performed by heating up to 500 to 1000° C. at a rate of 5 to 20° C./min, and then heat treatment for 1 to 5 hours at that temperature.

If the rate of temperature increase is less than 5° C./min, side reactions other than the functional group removal reaction may occur. If the rate of temperature increase exceeds 20° C./min, the reaction may be proceeded at the exceeded temperature, which is not appropriate.

In addition, if the temperature is less than 500° C., the functional group may not be sufficiently removed. If the temperature exceeds 1000° C., graphitization of the porous carbon material may be proceeded.

In addition, if the heat treatment time after the temperature increase is less than 1 hour, the functional group may not be sufficiently removed. If the heat treatment time after the temperature increase exceeds 5 hours, side reactions other than the functional group removal reaction may occur.

Through the heat treatment above, a porous carbon material from which the functional group of the porous carbon material surface-modified with the functional group was removed may be prepared.

Generally, in the case of porous carbon material prepared by heat treatment, the heat treatment temperature is about 1500° C. or higher. At this temperature, not only the functional groups are removed from the porous carbon material but also the graphitization reaction occurs.

However, in the present invention, since heat treatment is carried out at a temperature of 500 to 1000° C., only the functional group can be removed without graphitization of the porous carbon material. Therefore, even after the heat treatment, the properties of the porous carbon material before the heat treatment can be maintained as it is, thereby exhibiting a high electrical conductivity like the porous carbon material surface-modified with the hydrophilic functional group.

As a result of thermogravimetric analysis (TGA) of the porous carbon material from which the functional group is removed by heat treatment, the weight loss rate is 1% or less when heated up from 0° C. to 900° C. Since the removal of the functional group was carried out through heat treatment, the weight loss was very slight in thermogravimetric analysis. However, the porous carbon material surface-modified with the hydrophilic functional group contains the functional group, resulting in a weight loss of 2% or more.

In addition, the porous carbon material from which the functional group is removed by the heat treatment has a D/G peak ratio of 0.8 to 1.5 at the Raman measurement. If the ratio is less than 0.8, it means that the heat treatment has been performed at a high temperature of 2000° C. or higher, and thus the graphitization reaction occurs due to the high temperature, and damage to the porous carbon material occurs. If the ratio is higher than 1.5, the conductivity is greatly reduced.

Step (b) is a step of complexing the porous carbon material prepared in step (a), from which the functional group is removed, with sulfur powder to prepare a sulfur-carbon composite.

The porous carbon material from which the functional group has been removed and sulfur are preferably combined in a weight ratio of 1:1 to 1:9. If the sulfur content is less than the above range, the amount of active material is insufficient to be used as a positive electrode active material, and if the porous carbon material is less than the above range, the electrical conductivity of the sulfur-carbon composite will not be sufficient. Therefore, the content of sulfur and carbon material is properly adjusted within the above range.

The complexing method is not particularly limited, and methods commonly used in the art may be used, such as dry complexation or wet complexation such as spray coating. More specifically, a method can be used that allows molten sulfur to be evenly supported on the inside and on the surface of the porous carbon material from which the functional groups have been removed, by ball-milling and pulverizing the sulfur powder and the functional group-removed porous carbon material and then placing in an oven at 120 to 160° C. for 20 minutes to 1 hour.

The specific surface area of the sulfur-carbon composite is 7 to 20 $m^2/g$, preferably 8 to 15 $m^2/g$. If the specific surface area of the sulfur-carbon composite is less than 7 $m^2/g$, it means that sulfur is covering the surface of the porous carbon material, and that sulfur is not evenly supported on the porous carbon material, and thus the electrical conductivity of the sulfur-carbon composite can be reduced. If the specific surface area of the sulfur-carbon composite exceeds 20 $m^2/g$, it means that sulfur is not properly supported inside the porous carbon material.

In addition, the pore volume of the sulfur-carbon composite of the present invention is 0.1 to 0.3 $cm^3/g$, preferably 0.1 to 0.15 $cm^3/g$. If the pore volume of the sulfur-carbon composite is less than 0.1 $cm^3/g$, it means that sulfur is covering the surface of the porous carbon material, and that sulfur is not evenly supported on the porous carbon material, and thus the electrical conductivity of the sulfur-carbon composite can be reduced. If the pore volume of the sulfur-carbon composite exceeds 0.3 $cm^3/g$, it means that sulfur is not properly supported inside the porous carbon material.

Positive Electrode for Lithium Secondary Battery

In addition, the present invention relates to a positive electrode for a lithium secondary battery comprising the sulfur-carbon composite of the present invention described above.

The sulfur-carbon composite may be used as a positive electrode active material of a positive electrode for a lithium secondary battery, and the positive electrode for a lithium secondary battery may be preferably a positive electrode for a lithium-sulfur battery.

The positive electrode may be formed by applying a positive electrode composition to the current collector and vacuum-drying it.

The positive electrode current collector generally can be made in a thickness of 3 to 500 μm and is not particularly limited as long as it has high electrical conductivity without causing chemical changes in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam, or nonwoven fabric.

The positive electrode composition may comprise the sulfur-carbon composite of the present invention as a positive electrode active material, and may further comprise a conductive material and a binder.

The conductive material imparts additional conductivity to the positive electrode active material and serves to cause electrons to move smoothly in the positive electrode, and is not particularly limited as long as it does not cause chemical changes in the battery and provides an excellent electrical conductivity and a large surface area, but preferably a carbon-based material is used.

The carbon-based material may be one selected from the group consisting of graphite-based materials such as natural graphite, artificial graphite, expanded graphite, and graphene; active carbon-based material; carbon black-based materials such as channel black, furnace black, thermal black, contact black, lamp black, and acetylene black; carbon fiber-based material; carbon nano structures such as carbon nanotube (CNT) and fullerene; and a combination thereof.

In addition to the carbon-based materials, metallic fiber such as metal mesh; metallic powder such as copper (Cu), silver (Ag), nickel (Ni), and aluminum (Al); or organic conductive materials such as polyphenylene derivatives may also be used according to purpose. The conductive materials may be used alone or in a combination thereof.

In addition, the binder provides the positive electrode active material with the adhesion to the current collector. The binder should be well dissolved in a solvent, and the binder not only has to constitute a conductive network between the positive electrode active material and the conductive material, but also should have a moderate impregnation property for an electrolyte solution.

The binder applicable to the present invention may be any binder known in the art, and specifically may be at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulosic binders comprising carboxy methyl cellulose (CMC), starch, hydroxypropyl cellulose, and regenerated cellulose; polyalcohol-based binder; polyolefin-based binders comprising polyethylene and polypropylene; polyimide-based binders, polyester-based binders, and silane-based binders, or a mixture or copolymer of two or more of these, but is not limited thereto.

The content of the binder resin may be, but is not limited to, 0.5 to 30 wt. % based on the total weight of the positive electrode composition. If the content of the binder resin is less than 0.5 wt. %, the physical properties of the positive electrode may be degraded and thus the positive electrode active material and conductive material may be eliminated. If the content exceeds 30 wt. %, the ratio of the active material and the conductive material in the positive electrode is relatively reduced and thus the capacity of the battery can be reduced.

The positive electrode composition is prepared in slurry state and applied on the positive electrode current collector. The solvent for making the positive electrode composition in slurry state should be easy to dry, and should dissolve the binder well, but a solvent capable of keeping the positive electrode active material and the conductive material in a dispersed state without dissolving them is most preferable. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems with the conductive network, thereby causing problems with regard to the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The mixing of the positive electrode composition can be carried out by a conventional method using a conventional mixer such as a paste mixer, a high-speed shear mixer, or a homo-mixer.

The slurry can be coated on the current collector in an appropriate thickness depending on the viscosity of the slurry and the thickness of the positive electrode to be formed, and can be suitably selected within the range of 10 to 300 μm.

In that case, there is no limitation on the method of coating the slurry, and examples thereof may comprise doctor blade coating, dip coating, gravure coating, slit die coating, spin coating, comma coating, bar coating, reverse roll coating, screen coating, and cap coating methods.

Lithium Secondary Battery

In addition, the present invention relates to a lithium secondary battery comprising a positive electrode; a negative electrode; a separator interposed between the positive electrode and the negative electrode; and an electrolyte solution, wherein the positive electrode is the positive electrode for the lithium secondary battery of the present invention described above.

In addition, the lithium secondary battery of the present invention may be preferably a lithium-sulfur battery.

The negative electrode may be composed of a current collector and a negative electrode active material layer formed on one or both surfaces thereof. In addition, the negative electrode may be a lithium metal plate.

The current collector is for supporting the negative electrode active material and is not particularly limited as long as it is electrochemically stable in the voltage range of the lithium secondary battery while having excellent conductivity, and for example, copper, stainless steel, aluminum, nickel, titanium, palladium, sintered carbon, or copper or stainless steel whose surface is treated with carbon, nickel, silver or the like, or aluminum-cadmium alloy or the like may be used.

The negative electrode current collector can enhance the bonding force with the negative electrode active material by having fine irregularities on its surface, and may be formed in various forms such as film, sheet, foil, mesh, net, porous body, foam, or nonwoven fabric.

The negative electrode active material may comprise a material capable of reversibly intercalating or deintercalating lithium ion, a material capable of reacting with lithium ion to reversibly form lithium containing compounds, or lithium metal or lithium alloy.

The material capable of reversibly intercalating or deintercalating lithium ion can be, for example, crystalline carbon, amorphous carbon, or a mixture thereof.

The material capable of reacting with lithium ion to reversibly form lithium containing compounds may be, for example, tin oxide, titanium nitrate, or silicon.

The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

A separator is additionally comprised between the positive electrode and the negative electrode. The separator enables the transport of lithium ions between the positive electrode and the negative electrode while separating or insulating the positive electrode and the negative electrode from each other. The separator may be made of a porous, nonconductive or insulating material. The separator may be an independent member such as a film or a coating layer added to the positive electrode and/or the negative electrode.

The material constituting the separator comprises, for example, but is not limited to, polyolefins such as polyethylene and polypropylene, glass fiber filter paper, and ceramic materials, and the thickness thereof may be about 5 to about 50 μm, preferably about 5 to about 25 μm.

The electrolyte solution is a non-aqueous electrolyte containing lithium salts and is composed of a lithium salt and an electrolyte solution. As the electrolyte solution, non-aqueous organic solvents, organic solid electrolytes, and inorganic solid electrolytes may be used.

As the lithium salt, lithium salts conventionally used in the electrolyte solution for the lithium-sulfur battery may be used without limitation. The lithium salt may comprise, for example, at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate and the like.

In addition, the concentration of the lithium salt in the electrolyte solution may be 0.2 to 2 M, preferably 0.6 to 2 M, more preferably, 0.7 to 1.7 M. If the concentration of the lithium salt is less than 0.2 M, the conductivity of the electrolyte solution may be lowered and thus the performance of the electrolyte solution may be deteriorated. If the concentration of the lithium salt exceeds 2 M, the viscosity of the electrolyte solution may increase and thus the mobility of the lithium ion may be reduced.

The non-aqueous organic solvent should dissolve the lithium salt well, and the non-aqueous organic solvent of the present invention may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or as a mixture of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

The electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature, and fluoroethylene carbonate (FEC), propene sultone (PRS), fluoropropylene carbonate (FPC) and the like can be further comprised.

As an electrolyte, a liquid electrolyte may be used or also an electrolyte separator form in a solid state may be used. When using a liquid electrolyte, a separator made of porous glass, plastic, ceramic, or polymer is further comprised as a physical separator having a function of physically separating the electrodes.

Hereinafter, the present invention will be described in detail by way of examples to specifically illustrate the present invention. However, the examples according to the present invention may be modified in various other forms, and the scope of the present invention should not be construed as being limited to the examples described below. The examples of the present invention are provided to more completely explain the present invention to those skilled in the art.

<Preparation of Sulfur-Carbon Composite>

Example 1

10 g of carbon nanotubes (CNano, FT6120) treated with an acid were purged for 1 hour in an argon atmosphere. Thereafter, the temperature was raised to 850° C. at a rate of 10° C./min, followed by heat treatment for 3 hours, to prepare carbon nanotubes from which functional groups were removed.

The carbon nanotubes, from which the functional groups were removed, and sulfur were mixed at a weight ratio of 25:75, and reacted for 35 minutes at a temperature of 155° C. to prepare the sulfur-carbon composite having sulfur supported in the inside (pores) and on the surface of the carbon nanotubes (FIGS. 1 and 2).

Example 2

Sulfur-carbon composites having sulfur supported in the inside (pores) and on the surface of carbon nanotubes were prepared in the same manner as in Example 1, except that carbon nanotubes (SUSN, HCNTS10) were used (FIGS. 3 and 4).

Comparative Example 1

The carbon nanotubes (CNano, FT6120) surface-modified with a hydrophilic functional group and sulfur were mixed in a weight ratio of 25:75, and then reacted at a temperature of 155 for 35 minutes to form sulfur-carbon composite having sulfur supported in the inside (pores) and on the surface of the carbon nanotubes.

Comparative Example 2

Sulfur-carbon composite having sulfur supported in the inside (pores) and on the surface of the carbon nanotubes were prepared in the same manner as in Comparative Example 1, except that carbon nanotubes (SUSN, HCNTS10) surface-modified with hydrophilic functional groups were used.

Comparative Example 3

10 g of carbon nanotubes (SUSN, HCNTS10) treated with an acid were purged for 1 hour in an argon atmosphere. Thereafter, the temperature was raised to 2000° C. at a rate of 10° C./min, followed by heat treatment for 3 hours, to prepare carbon nanotubes from which functional groups were removed.

The carbon nanotubes, from which the functional groups were removed, and sulfur were mixed at a weight ratio of 25:75, and reacted for 35 minutes at a temperature of 155° C. to prepare sulfur-carbon composite having sulfur supported in the inside (pores) and on the surface of the carbon nanotubes.

Experimental Example 1: Thermogravimetric Analysis Measurement of Carbon Nanotube Thermogravimetric analysis (TGA) of the carbon nanotubes of Examples 1 and 2, Comparative Example 1, and Comparative Example 2 was performed. The temperature was raised from 0° C. to 900° C. At this time, the weight reduction rate was measured to determine whether the functional groups of the carbon nanotubes were removed.

The results are shown in FIGS. 5 and 6.

It can be seen that the carbon nanotubes of Comparative Examples 1 and 2 showed a weight loss of 2% or more as the temperature increased, respectively, thereby indicating that the carbon nanotubes contain functional groups.

However, the carbon nanotubes of Examples 1 and 2 showed a weight reduction rate of about 1% or less even when the temperature was increased, thereby maintaining the weight. Accordingly, it can be seen through the heat treatment process of Examples 1 and 2 that the functional groups of the carbon nanotubes are removed, and that the functional groups of about 2 to 4% by weight are removed.

Experimental Example 2: Raman Measurement of Carbon Nanotube

Raman analysis of the carbon nanotubes of Example 2, Comparative Example 2, and Comparative Example 3 was carried out to measure the D/G ratio of the carbon nanotubes.

The results are shown in FIGS. 7 to 9.

The carbon nanotubes of Example 2, from which the functional group was removed by low temperature heat treatment at a temperature of 500 to 1000° C. of Comparative Example 2, showed a D/G ratio of 1.03. It was confirmed that the carbon nanotubes of Comparative Example 2 before the heat treatment showed a D/G ratio of 0.94, thereby indicating that the D/G ratio before and after the heat treatment was not significantly changed. From this, it can be seen that during the removal of functional groups, the degree of graphitization of carbon nanotubes does not change significantly.

On the other hand, the carbon nanotubes of Comparative Example 3, which was heat-treated at a high temperature of 2000° C., showed a D/G ratio of 0.51. The reason may be that the graphitization of the carbon nanotubes was progressed at that temperature and thus the G peak was increased.

From this, it can be seen that the heat treatment process for removing the functional group of the present invention selectively removes only the functional group without significantly changing the graphitization degree of the porous carbon material.

Experimental Example 3: Measurement of Specific Surface Area and Pore Volume of Sulfur-Carbon Composite Specific surface area and pore volume of sulfur-carbon composites prepared in Examples 1 and 2 and Comparative Examples 1 and 2 were measured using nitrogen adsorption equipment from Belsorp company, and the results are shown in Table 1 below

TABLE 1

|  | Example 1 | Example 2 | Comparative Example 1 | Comparative Example 2 |
|---|---|---|---|---|
| Specific surface area | 8.359 $m^2/g$ | 13.726 $m^2/g$ | 5.863 $m^2/g$ | 6.864 $m^2/g$ |
| Pore volume | 0.106 $cm^3/g$ | 0.13 $cm^3/g$ | 0.08 $cm^3/g$ | 0.08 $cm^3/g$ |

From the results of Table 1, it was confirmed that the sulfur-carbon composites of Examples 1 and 2 made of carbon nanotubes, from which the functional groups were removed, have a larger specific surface area and pore volume than the sulfur-carbon composites of Comparative Examples 1 and 2 made of carbon nanotubes containing functional groups.

Therefore, it can be seen that the sulfur-carbon composite, comprising carbon nanotubes from which functional groups have been removed, has high specific surface area and pore volume, since sulfur is evenly supported in the pores and on the surfaces of the carbon nanotubes.

Experimental Example 4: Measurement of Electrical Conductivity of Sulfur-Carbon Composite The electrical conductivity of the sulfur-carbon composites prepared in Examples 1 and 2 and Comparative Examples 1 and 2 was measured using a powder resistance meter from HANTECH company.

The results are shown in FIGS. 10 and 11.

It was confirmed that the sulfur-carbon composites of Examples 1 and 2 made of carbon nanotubes from which the functional groups were removed show higher electrical conductivity than the sulfur-carbon composites of Comparative Examples 1 and 2 made of carbon nanotubes containing functional groups.

As confirmed in Experimental Example 3, the sulfur-carbon composite comprising carbon nanotubes from which the functional groups were removed may have high electrical conductivity since sulfur is evenly supported in the pores and on the surfaces of the carbon nanotubes.

On the other hand, the sulfur-carbon composites comprising the carbon nanotubes containing the functional groups did not show high electrical conductivity because sulfur covered the surface of the porous carbon material.

Experimental Example 5: Evaluation of Charging/Discharging and Lifetime Characteristics of Lithium-Sulfur Battery Lithium-sulfur batteries (coin cells) were manufactured using the sulfur-carbon composites prepared in Examples 1 and 2 and Comparative Examples 1 and 2 as a positive electrode active material, respectively.

0.2 g of a conductive material (Denka black) and 5 g of carboxymethyl cellulose (CMC) were added and mixed together with zirconia balls. Then, 3.6 g of sulfur-carbon composite and a predetermined amount of water were added and mixed again. Finally, 0.35 g of styrene-butadiene rubber (SBR) was added and mixed again to prepare a slurry.

The prepared slurry was poured onto aluminum foil, coated with a blade coater to a thickness of 200 μm, and dried in an oven at 50° C. to prepare a positive electrode for a lithium-sulfur battery.

In a glove box under an argon atmosphere, a coin cell was assembled by placing a positive electrode, a separator (polyethylene), a lithium negative electrode, a gasket, a stainless steel coin, a spring, and an upper plate of stainless steel in turn on a lower plate of stainless steel and applying pressure thereto.

A mixed solution of 1,3-dioxolane (DOL):diethylene glycol dimethyl ether (DEGDME)=4:6 (v/v), into which 1 wt. % $LiNO_3$ in 1M LiTFSI was dissolved, as the electrolyte solution was injected onto the punched positive electrode.

5-1. Evaluation of Charging/Discharging

The lithium-sulfur batteries of Examples 1 and 2 and Comparative Examples 1 and 2 were tested for changes in charging/discharging characteristics using a charging/discharging measuring device. The obtained battery was examined for initial capacity under the conditions of 0.1 C/0.1 C charging/discharging, and the results are shown in FIGS. 12 and 13.

The lithium-sulfur batteries comprising the sulfur-carbon composites of Examples 1 and 2 were found to have improved discharge capacity and overvoltage as compared to the lithium-sulfur batteries comprising the sulfur-carbon composites of Comparative Examples 1 and 2.

The sulfur-carbon composites of Examples 1 and 2 evenly support sulfur. It was confirmed that the evenly supported sulfur improved the reactivity of the sulfur reduction reaction ($S_8$+16Li→8$Li_2$S), thereby increasing the discharge capacity and improving the overvoltage.

On the other hand, in the case of the sulfur-carbon composites comprising the carbon nanotubes containing the functional groups, sulfur covers the surface of the porous carbon material so that the reactivity of the sulfur reduction reaction did not improve, showing a lower result than Examples 1 and 2.

5-2. Evaluation of Lifetime Characteristics

The lifetime characteristics of the lithium-sulfur batteries of Examples 1 and 2 and Comparative Examples 1 and 2 were evaluated.

The lifetime characteristics were measured by repeating 0.1 C/0.1 C charging/discharging for the first 3 cycles, then 0.2 C/0.2 C charging/discharging for 3 cycles, and then 0.5 C/0.5 C charging/discharging for 100 cycles, using the charging/discharging measuring device, and the results are shown in FIGS. 14 and 15.

The lithium-sulfur battery comprising sulfur-carbon composites of Examples 1 and 2 showed a result of maintaining capacity for 100 cycles. However, the lithium-sulfur battery comprising sulfur-carbon composites of Comparative Examples 1 and 2 showed a result of not maintaining capacity for 100 cycles.

Therefore, it can be seen that the lithium-sulfur batteries comprising the sulfur-carbon composites of Examples 1 and 2 have improved lifetime characteristics as compared to the lithium-sulfur batteries comprising the sulfur-carbon composites of Comparative Examples 1 and 2.

It can be seen that carbon nanotubes of the sulfur-carbon composites of Examples 1 and 2 carry sulfur evenly as the functional groups are removed, thereby improving the lifetime characteristics of the battery comprising the same.

The invention claimed is:

1. A sulfur-carbon composite comprising:
   a porous carbon material, wherein the porous carbon material comprises carbon nanotubes, and wherein the porous carbon material is not graphitized; and
   sulfur, wherein the sulfur is present in at least a part of an inside of the porous carbon material and on a surface of the porous carbon material, wherein the sulfur-carbon composite has a specific surface area of 7 $m^2$/g to 20 $m^2$/g and a pore volume of 0.1 $cm^3$/g to 0.3 $cm^3$/g, and wherein the porous carbon material is a porous carbon material surface-modified with a hydrophilic functional group, where the functional groups have been removed by heat-treating the porous carbon material.

2. The sulfur-carbon composite of claim 1, wherein the sulfur-carbon composite comprises the porous carbon material and the sulfur in a weight ratio of 1:1 to 1:9.

3. The sulfur-carbon composite of claim 1, wherein the sulfur-carbon composite has a diameter of 0.1 μm to 20 μm.

4. A positive electrode for a lithium secondary battery comprising the sulfur-carbon composite of claim 1.

5. The positive electrode for the lithium secondary battery of claim 4, wherein the positive electrode for the lithium secondary battery is a positive electrode for a lithium-sulfur battery.

6. A lithium secondary battery comprising a positive electrode; a negative electrode; a separator interposed between the positive electrode and the negative electrode; and an electrolyte solution, wherein the positive electrode is the positive electrode of claim 4.

7. The lithium secondary battery of claim 6, wherein the lithium secondary battery is a lithium-sulfur battery.

* * * * *